United States Patent
Seen (10) Patent No.: US 7,714,821 B2
(45) Date of Patent: May 11, 2010

(54) OCB MODE LCD AND METHOD FOR DRIVING THE SAME

(75) Inventor: Seung Min Seen, Busan (KR)

(73) Assignee: Hydis Technologies Co., Ltd., Gyeonggi-Do (KR)

( * ) Notice: Subject to any disclaimer, the term of this patent is extended or adjusted under 35 U.S.C. 154(b) by 1302 days.

(21) Appl. No.: 11/196,136

(22) Filed: Aug. 3, 2005

(65) Prior Publication Data
US 2006/0044238 A1 Mar. 2, 2006

(30) Foreign Application Priority Data
Aug. 24, 2004 (KR) .................. 10-2004-0066830

(51) Int. Cl.
G09G 3/36 (2006.01)
(52) U.S. Cl. .................. 345/87; 345/50; 345/55; 349/138
(58) Field of Classification Search .......... 345/87, 345/30 A, 50–55, 90 A; 349/1–202
See application file for complete search history.

(56) References Cited

U.S. PATENT DOCUMENTS

| | | | |
|---|---|---|---|
| 5,223,963 A * | 6/1993 | Okada et al. ............. | 349/129 |
| 5,576,863 A * | 11/1996 | Aoki et al. .............. | 349/124 |
| 5,682,217 A * | 10/1997 | Hisatake et al. ......... | 349/123 |
| 6,256,082 B1 * | 7/2001 | Suzuki et al. ........... | 349/144 |
| 6,441,878 B1 * | 8/2002 | Wong ..................... | 349/143 |
| 6,469,765 B1 * | 10/2002 | Matsuyama et al. ...... | 349/143 |
| 6,532,054 B2 * | 3/2003 | Ohmuro et al. .......... | 349/143 |
| 6,791,650 B2 * | 9/2004 | Tanuma et al. .......... | 349/141 |
| 6,909,412 B2 * | 6/2005 | Son ........................ | 345/87 |
| 6,909,686 B2 * | 6/2005 | Iwasaki et al. .......... | 369/112.02 |
| 7,064,803 B2 * | 6/2006 | Okazaki et al. ......... | 349/178 |

(Continued)

FOREIGN PATENT DOCUMENTS

JP   2000-321588   11/2000

(Continued)

OTHER PUBLICATIONS

Three page English translation of an action from the Japanese Patent Office, for patent application number (JP) 2005-238254, drafted date Nov. 7, 2008.

*Primary Examiner*—Bipin Shalwala
*Assistant Examiner*—Afroza Y Chowdhury
(74) *Attorney, Agent, or Firm*—Joseph Krause; Kelly & Krause, L.P.

(57) ABSTRACT

Disclosed is an OCB mode liquid crystal display and a method for driving the same. The OCB mode liquid crystal display includes at least one pair of upper and lower pre-tilt electrodes to partially cover each of upper and lower driving electrodes. A pre-tilt voltage equal to or higher than a transition voltage is applied between the upper and lower pre-tilt electrodes to shift liquid crystal molecules into a first orientation state, that is, to shift a portion of the liquid crystal molecules into a bend or vertical orientation state. Therefore, although a low driving voltage is applied between the upper and lower driving electrodes, the liquid crystal molecules can rapidly be shifted into a second orientation state for screen display. Consequently, a high response speed can be achieved, so that it is possible to display a high-speed moving picture and to reduce power consumption.

13 Claims, 5 Drawing Sheets

U.S. PATENT DOCUMENTS

| | | | |
|---|---|---|---|
| 7,283,191 B2 * | 10/2007 | Tanaka | 349/134 |
| 7,336,250 B2 * | 2/2008 | Shiraishi et al. | 345/89 |
| RE40,770 E * | 6/2009 | Maeda | 345/90 |
| 2001/0038369 A1 * | 11/2001 | Adachi et al. | 345/87 |
| 2002/0027539 A1 * | 3/2002 | Son | 345/87 |
| 2002/0057247 A1 * | 5/2002 | Lee et al. | 345/88 |
| 2003/0048402 A1 * | 3/2003 | Konno et al. | 349/141 |
| 2004/0100598 A1 * | 5/2004 | Adachi et al. | 349/113 |
| 2004/0252092 A1 * | 12/2004 | Roosendaal | 345/87 |

FOREIGN PATENT DOCUMENTS

| | | |
|---|---|---|
| JP | 2002-311456 | 10/2002 |
| JP | 2003-084299 | 3/2003 |
| WO | WO 00/14597 | 3/2000 |

* cited by examiner

OCB MODE LCD AND METHOD FOR DRIVING THE SAME

BACKGROUND OF THE INVENTION

1. Field of the Invention

The present invention relates to an OCB (Optically Compensated Bend) mode liquid crystal display and a driving method thereof, and more particularly to an OCB mode liquid crystal display which can rapidly shift the orientation state of liquid crystal molecules from an initial orientation state into an orientation state for screen display while consuming low power, and a method for driving the same.

2. Description of the Prior Art

As generally known in the art, liquid crystal displays are light, thin, short and small, are driven by a low voltage, and consumes a small power, so that the liquid crystal displays are now replacing cathode ray tubes (CRTs). Particularly, a thin-film transistor liquid crystal display has been a high-quality, a large size and colorization equal to those of the CRT, so that the thin-film transistor liquid crystal display is being variously utilized in many fields. Such a liquid crystal display includes an array substrate on which thin-film transistors and pixel electrodes are mounted, and a color-filter substrate on which a color filter and corresponding electrodes are mounted. The array substrate and the color-filter substrate are attached to each other with a liquid crystal layer interposed between the substrates. Generally, the liquid crystal display utilizes twisted-nematic (TN) mode liquid crystal.

A TN mode liquid crystal display has a high contrast in image display but has strong viewing-angle dependence. In order to solve such viewing-angle characteristic of the TN mode liquid crystal display, various methods including a pixel area division technique have been proposed. Also, to this end, an in-plane switching (IPS) mode liquid crystal display and a technique of forming a double domain in a liquid crystal layer have been proposed. Herein, the technique of forming a double domain in a liquid crystal layer includes a multiple rubbing method, a multiple orientation method, an edge fringe field method and a parallel fringe field method.

However, the conventional liquid crystal displays manufactured by the above-mentioned methods still have a problem in that they have a low response speed. That is, since the liquid crystal display utilizing the TN mode liquid crystal has a low response speed (the response speed between gradation displays is 100 ms in maximum), it is impossible to achieve 16.7 ms required to display a high-speed moving picture. Therefore, it has been required to develop a liquid crystal display having a wide viewing angle and a high response speed enough to display a high-speed moving picture. As a result, an OCB (Optically Compensated Bend) mode liquid crystal display has been proposed in order to improve a response speed and to obtain a uniform viewing-angle characteristic in all directions.

Figure 1A:
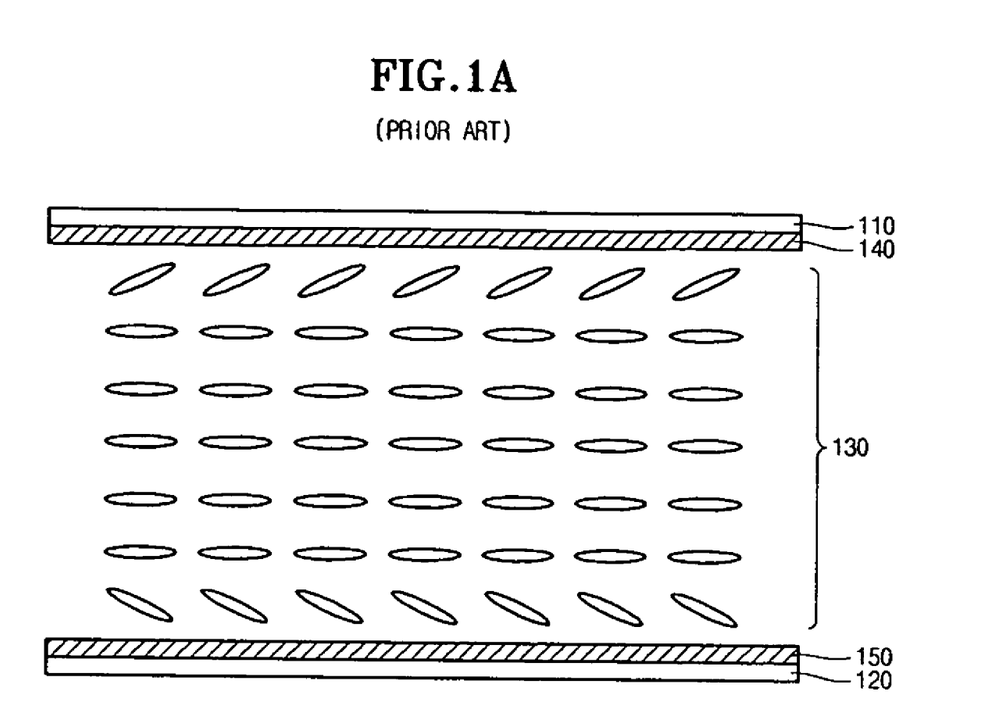
FIG. 1A to 1C are views for explaining the construction and the operation of a conventional OCB mode liquid crystal display.

Hereinafter, the construction and the operation of a conventional OCB mode liquid crystal display will be schematically described with reference to FIGS. 1A to 1C.

The conventional OCB mode liquid crystal display contains: an upper substrate 110 including a color filter, an upper driving electrode 140 and an orientation layer; a lower substrate 120 including a TFT (Thin Film Transistor), an lower driving electrode 150 and an orientation layer; and liquid crystal molecules 130 interposed between the upper and lower substrates 110 and 120. In this case, all the orientation layers included in the upper and lower substrates 110 and 120 are aligned in the same direction to each other. In the OCB mode liquid crystal display having such a construction, when a voltage is not applied between the upper and lower electrodes 140 and 150, the liquid crystal molecules 130 are, as shown in FIG. 1A, maintained in a splay orientation state (which is an initial orientation state) according to the orientation processing direction of the orientation layers.

Figure 1B:
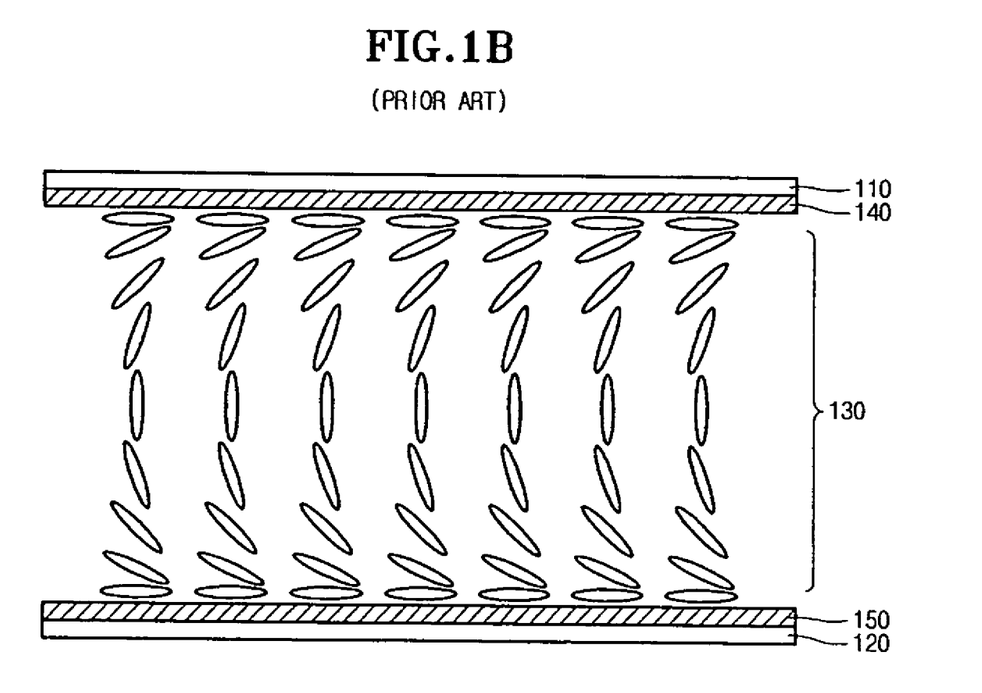
Figure 1C:
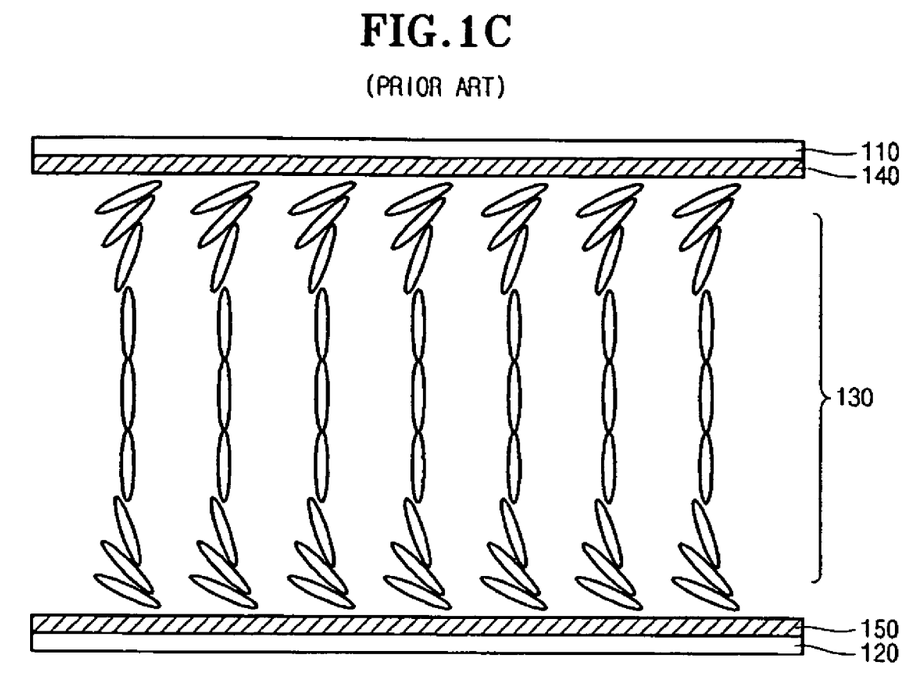

Meanwhile, when a pre-tilt voltage is applied between the upper and lower electrodes 140 and 150, the liquid crystal molecules 130 are shifted from the splay orientation state into a bend orientation state as shown in FIG. 1B. In this case, the pre-tilt voltage must be higher than a transition voltage which is required for the liquid crystal molecules 130 to start a transition from the splay orientation state to the bend orientation state. A time period required for the liquid crystal molecules 130 to start a transition from the splay orientation state to the bend orientation state is called "transition time". When a driving voltage is applied between the upper and lower electrodes 140 and 150, the liquid crystal molecules 130 are shifted from the bend orientation state into a vertical orientation state by the driving voltage as shown in FIG. 1C, thereby linearly transmitting light. Thereafter, when there is no applied voltage, the liquid crystal molecules 130 are again shifted into the splay orientation state.

As described above, according to the conventional OCB mode liquid crystal display, the sate of the liquid crystal molecules 130 is repeatedly shifted in the sequence of the splay orientation state, the bend orientation state and the vertical orientation state by the voltage applied between the upper and lower electrodes 140 and 150, thereby displaying an image. In this case, a pre-tilt voltage is first applied and then the driving voltage is applied so as to display an image.

However, such a conventional OCB mode liquid crystal display requires lots of power for the pre-tilt voltage to shift the liquid crystal molecules from the splay orientation state into the band orientation state, thereby increasing power consumption. Also, the conventional OCB mode liquid crystal display has problems in that the transition speed from the splay orientation state to the bend orientation state is slow (in fact, the transition between the two states is an unnecessary step in the process of displaying an image), its driving voltage is high, and it is difficult to achieve the bend orientation.

In order to solve such problems, there has been proposed a method for holding the liquid crystal molecules in a high pre-tilt state by mixing a monomer or a UV curing agent with liquid crystal molecules so as to easily achieve a transition to the bend orientation. As another method to solve the problems, Korean Patent Laid-Open Publication No. 2002-0097025 discloses a method for forming slant of a continuous saw-tooth shape on a cell surface so as to use the slant surface as a nucleus to shift liquid crystal molecules into the bend orientation state.

However, the former method has a problem in uniformity of display and the latter method has a difficulty in forming a slant surface on an ITO layer. Therefore, it is difficult to actually use either of the methods.

SUMMARY OF THE INVENTION

Accordingly, the present invention has been made to solve the above-mentioned problems occurring in the prior art, and an object of the present invention is to provide an OCB mode liquid crystal display which can rapidly shift the orientation state of liquid crystal molecules from an initial orientation state into an orientation state for screen display while reducing power consumption, and a method for driving the same.

In order to accomplish this object, there is provided an OCB mode liquid crystal display comprising: upper and lower driving electrodes to which a driving voltage is applied, the upper and lower driving electrodes being provided at upper and lower substrates opposed to each other, respectively; a liquid crystal layer including a plurality of liquid crystal molecules interposed between the upper and lower substrates; and at least one pair of upper and lower pre-tilt electrodes to which a voltage to shift an orientation state of a portion of the liquid crystal molecules is applied, the upper and lower pre-tilt electrodes being located to partially cover each of the upper and lower driving electrodes.

In accordance with another aspect of the present invention, the pair of upper and lower pre-tilt electrodes are located in parallel to surfaces of the substrates, and are opposed to each other with the liquid crystal layer interposed between them in a direction perpendicular to the surfaces of the substrates.

In accordance with still another aspect of the present invention, there is provided an OCB mode liquid crystal display comprising: an array of upper and lower driving electrodes provided in upper and lower substrates, the upper and lower driving electrodes forming a pair, the upper and lower substrates being opposed to each other; a liquid crystal layer including a plurality of liquid crystal molecules interposed between the upper and lower substrates; and at least one pair of upper and lower pre-tilt electrodes corresponding to each pair of the upper and lower driving electrodes, the upper and lower pre-tilt electrodes being arranged to partially cover each of the upper and lower driving electrodes with an insulation layer interposed between the upper pre-tilt electrode and the upper driving electrode and with an insulation layer between the lower pre-tilt electrode and the lower driving electrode, upper and lower pre-tilt electrodes receiving a voltage to shift an orientation state of a portion of the liquid crystal molecules.

In accordance with still another aspect of the present invention, there is provided an OCB mode liquid crystal display comprising: a pair of substrates opposed to each other with a liquid crystal layer interposed between them; a common electrode formed on one of the substrates; a pixel electrode array to which a driving voltage is applied, the pixel electrode being formed on another of the substrates; and at least one pre-tilt electrode being arranged to partially cover each pixel electrode of the pixel electrode array, and receiving a pre-tilt voltage to shift an orientation state of a portion of liquid crystal molecules included in the liquid crystal layer.

In accordance with sill another aspect of the present invention, there is provided a method for driving an OCB mode liquid crystal display, the method comprising the steps of: arranging liquid crystal molecules into a first orientation state by applying the pre-tilt voltage to upper and lower substrates for each pixel, the liquid crystal molecules being oriented in partially different orientations in the first orientation state; and shifting the liquid crystal molecules from the first orientation state into a second orientation state for image display by applying the driving voltage to the upper and lower substrates, all the liquid crystal molecules being oriented in an equal direction for image display in the second orientation state.

In accordance with still another aspect of the present invention, the applied pre-tilt voltage has a higher level than that of the driving voltage for image display.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description and drawings, the same reference numerals are used to designate the same or similar components, and so repetition of the description on the same or similar components will be omitted.

FIGS. 2A to 2D are views for explaining the construction and the operation of an OCB mode liquid crystal display according to an embodiment of the present invention.

The OCB mode liquid crystal display according to an embodiment of the present invention contains: an upper substrate 210 including a color filter, an upper driving electrode 240 and an orientation layer; a lower substrate 220 including a TFT (Thin Film Transistor), an lower driving electrode 250 and an orientation layer; and liquid crystal molecules 230 interposed between the upper and lower substrates 210 and 220. Insulation layers 260 and 261 are formed on the upper and lower driving electrodes 240 and 250 of the upper and lower substrates 210 and 220, respectively. Upper and lower pre-tilt electrodes 270 and 280 are formed on the insulation layers 260 and 261, respectively, in such a manner that each pre-tilt electrode 270 or 280 extends in parallel to the surface of a corresponding substrate 210 or 220 so as to partially cover a corresponding driving electrode 240 or 250. The upper and lower pre-tilt electrodes 270 and 280 are opposed to each other in the perpendicular direction to the surfaces of the substrates 210 and 220, thereby forming a pair. Each of the upper and lower driving electrodes 240 and 250 has at least one pre-tilt electrode 270 or 280. The orientation layers included in the upper and lower substrates 210 and 220 are aligned either in parallel or perpendicular to each other.

Figure 2A:
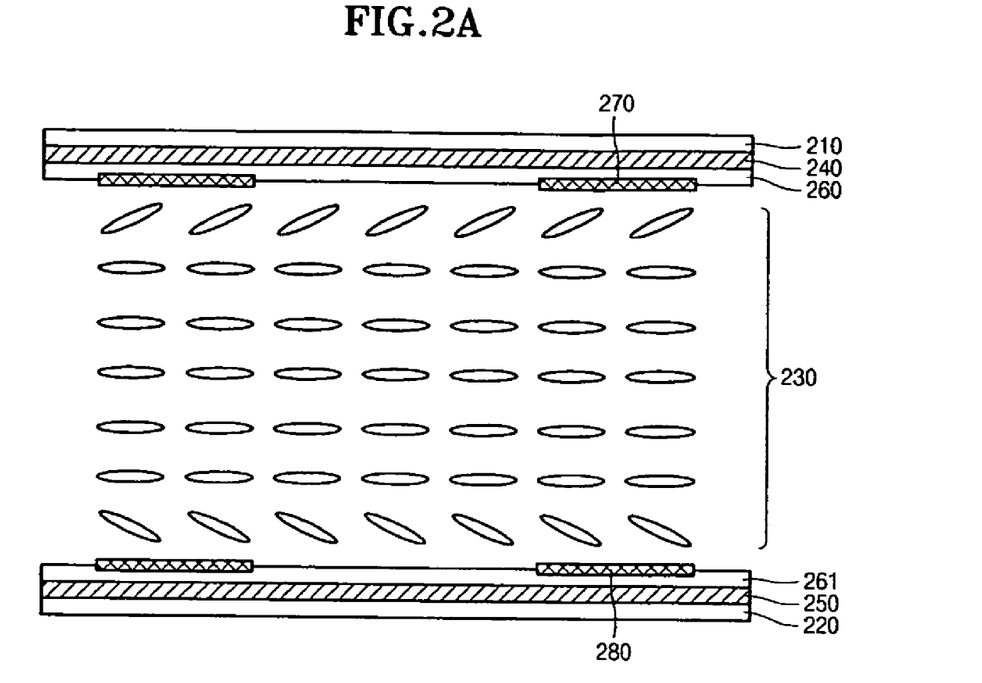
FIGS. 2A to 2D are views for explaining the construction and the operation of an OCB mode liquid crystal display according to an embodiment of the present invention.

In the OCB mode liquid crystal display having the construction as described above, when no voltage is applied between the upper and lower driving electrodes 240 and 250 and between the upper and lower pre-tilt electrodes 270 and 280, the liquid crystal molecules 230 are maintained in a splay orientation state (which is the initial orientation state) according to the aligned direction of the orientation layers as shown in FIG. 2A. In a state in which no voltage is applied between the upper and lower driving electrodes 240 and 250, when a pre-tilt voltage equal to or higher than a transition voltage $V_{tr}$ is applied between the upper and lower pre-tilt electrodes 270 and 280, the orientation state of the liquid crystal molecules positioned within the range between the upper and lower pre-tilt electrodes 270 and 280 is shifted from the initial orientation state into a first orientation state as shown in FIG. 2B or 2C.

Figure 2B:
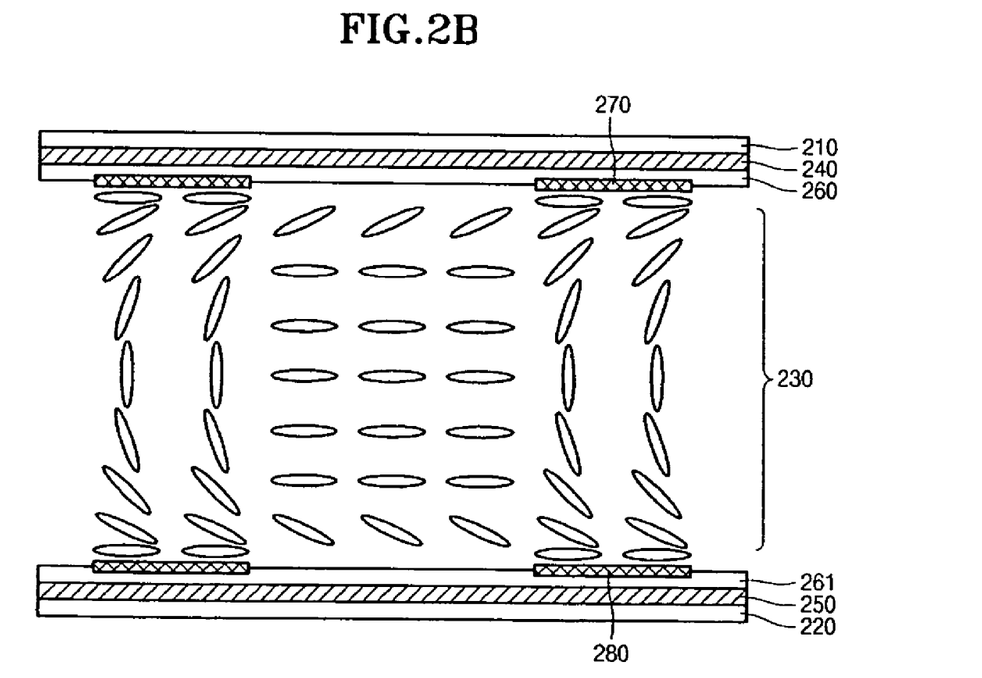
Figure 2C:
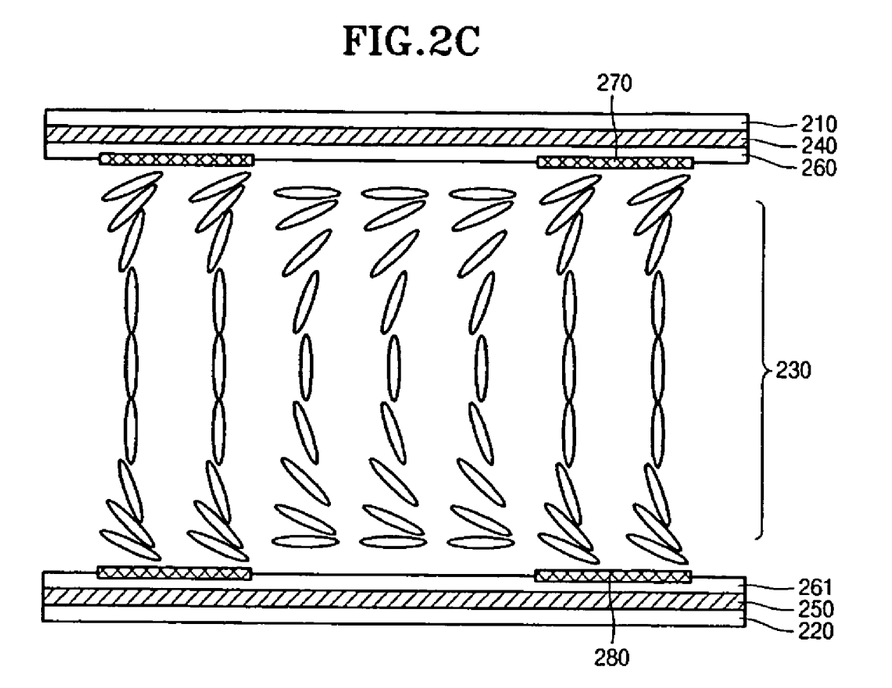

To be specific, in the state in which no voltage is applied between the upper and lower driving electrodes 240 and 250, when a first voltage is applied between the upper and lower pre-tilt electrodes 270 and 280, the orientation state of the liquid crystal molecules positioned within the range between the upper and lower pre-tilt electrodes 270 and 280 is shifted from the splay orientation state into a bend orientation state as shown in FIG. 2B. Also, when a second voltage higher than the first voltage is applied between the upper and lower pre-tilt electrodes 270 and 280, the orientation state of the liquid crystal molecules positioned within the range between the upper and lower pre-tilt electrodes 270 and 280 is shifted from the splay orientation state into a vertical orientation state as shown in FIG. 2C. In this case, the orientation state of liquid crystal molecules positioned adjacent to the range between the upper and lower pre-tilt electrodes 270 and 280 is also shifted from the splay orientation state into the bend orientation state, under the influence of the shifted orientation of the liquid crystal molecules positioned within the range between the upper and lower pre-tilt electrodes and an electric filed.

Figure 2D:
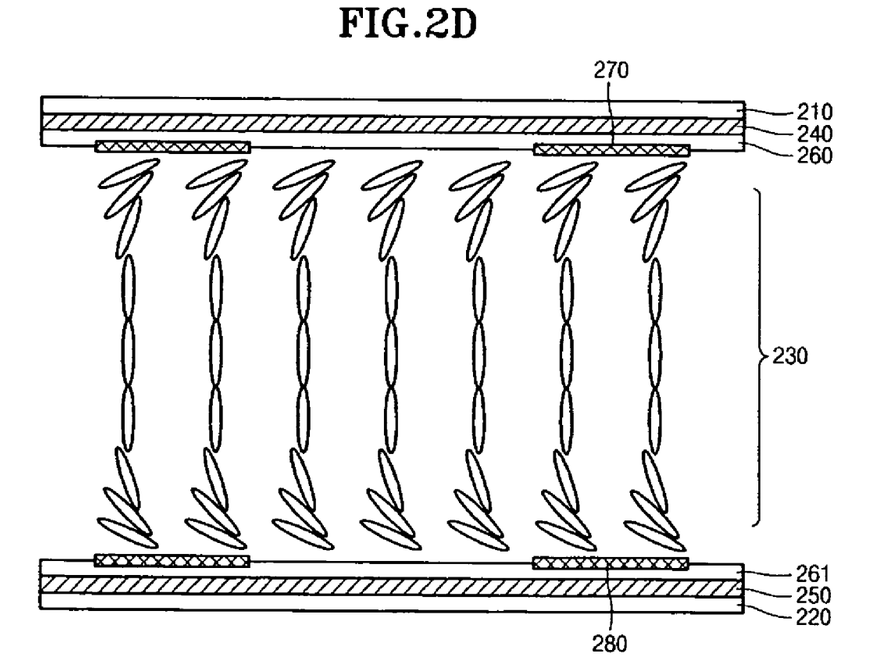

Thereafter, when a driving voltage is applied between the upper and lower driving electrodes 240 and 250, all the liquid crystal molecules 230 are shifted from the fist orientation state into a second orientation state for screen display as shown in FIG. 2D, thereby linearly transmitting light.

According to the above-mentioned OCB mode liquid crystal display, with no driving voltage applied between the upper and lower driving electrodes 240 and 250, a pre-tilt voltage equal to or higher than the transition voltage $V_{tr}$ is applied between the upper and lower pre-tilt electrodes 270 and 280, so that the liquid crystal molecules positioned within the range between the upper and lower pre-tilt electrodes 270 and 280 are aligned in the bend orientation state or in the vertical orientation state. That is, liquid crystal molecules are partially aligned in the first orientation state.

As described above, according to the OCB mode liquid crystal display of an embodiment of the present invention, differently from the conventional OCB mode liquid crystal display, the upper and lower pre-tilt electrodes 270 and 280 are formed to partially cover the upper and lower driving electrodes 240 and 250, respectively, so that it is possible to align the liquid crystal molecules in the first orientation state without exerting any effect upon screen display. As a result, although a driving voltage of a low level is applied between the upper and lower driving electrodes 240 and 250, the liquid crystal molecules 230 can rapidly be shifted from the first orientation state into the second orientation state for screen display.

Hereinafter, the operation of the OCB mode liquid crystal display according to an embodiment of the present invention will be described with reference to FIGS. 3 and 4.

Figure 3:
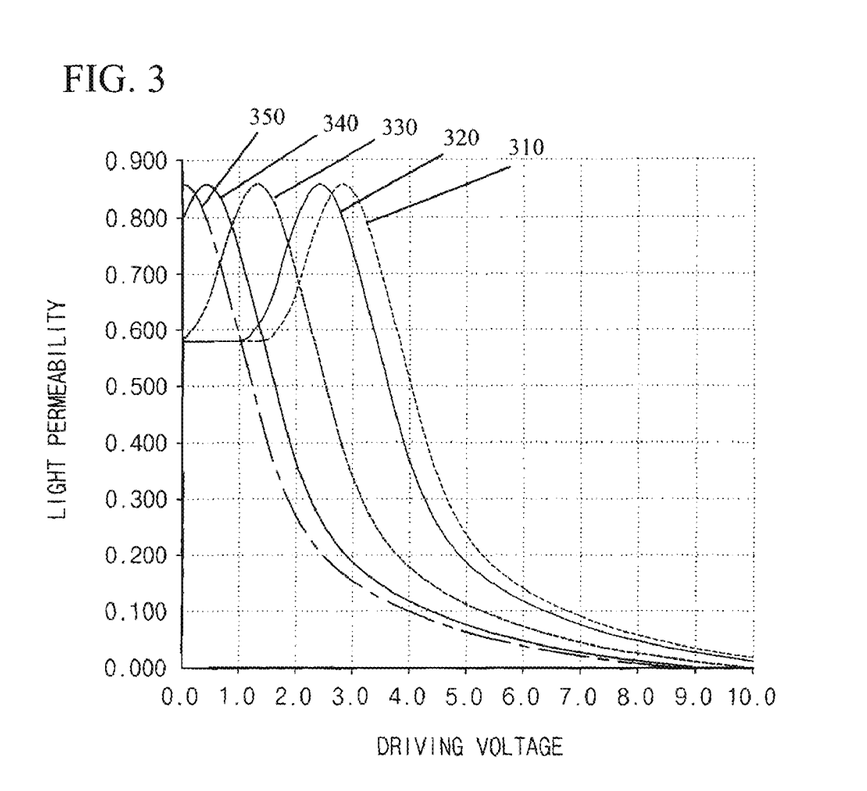
FIG. 3 shows a graph illustrating the light permeability of liquid crystal molecules corresponding to the changes of a pre-tilt voltage and a driving voltage according to an embodiment of the present invention.

FIG. 3 shows a graph illustrating light permeability according to driving voltages Vp applied between the upper and lower driving electrodes, in a state in which pre-tilt voltages $V_{set}$ of various levels are applied between upper and lower pre-tilt electrodes in a normal white type of OCB mode liquid crystal display.

To be specific, FIG. 3 shows light permeability of the liquid crystal molecules according to driving voltages applied between the upper and lower driving electrodes, in a state in which each pre-tilt voltage of 0V 310, 2V 320, 4V 330, 6V 340 and 8V 350 is applied between the upper and lower pre-tilt electrodes of the OCB mode liquid crystal display according to an embodiment of the present invention. Referring to FIG. 3, as the level of the pre-tilt voltage applied between the upper and lower pre-tilt electrodes rises higher, the magnitude of the transition voltage required to shift the orientation state of the liquid crystal molecules becomes lower, thereby also reducing the magnitude of the driving voltage Vp which is required to align all the liquid crystal molecules in the second orientation state. For reference, each driving voltage Vp corresponding to each inflection point in the graph becomes a transition voltage $V_{tr}$.

That is, the transition voltage $V_{tr}$ is 2.8V when the pre-tilt voltage $V_{set}$ is 0V, the transition voltage $V_{tr}$ is approximately 1.2V when the pre-tilt voltage $V_{set}$ is 4V, and the transition voltage $V_{tr}$ is approximately 0V when the pre-tilt voltage $V_{set}$ is 8V. Therefore, when the pre-tilt voltage $V_{set}$ of 0V is applied between the upper and lower pre-tilt electrodes of the OCB mode liquid crystal display having the above-mentioned construction, the initial orientation state of the liquid crystal molecules becomes the splay orientation state. In this case, a driving voltage Vp equal to or higher than 2.8V is applied between the upper and lower driving electrodes, the orientation state of the liquid crystal molecules starts to be shifted. Also, when the pre-tilt voltage $V_{set}$ of 4V is applied between the upper and lower pre-tilt electrodes, the transition voltage becomes approximately 1.2V. When the pre-tilt voltage $V_{set}$ of 8V is applied, the transition voltage becomes approximately 0V. In this case, when a driving voltage Vp equal to or higher than 0V is applied between the upper and lower driving electrodes, the orientation state of the liquid crystal molecules is shifted rapidly according to the magnitude of the driving voltage Vp.

Through such a procedure, the level of the pre-tilt voltage $V_{set}$ applied between the upper and lower pre-tilt electrodes of the OCB mode liquid crystal display is established, and the first orientation state of the liquid crystal molecules is determined by the established pre-tilt voltage $V_{set}$.

Figure 4:
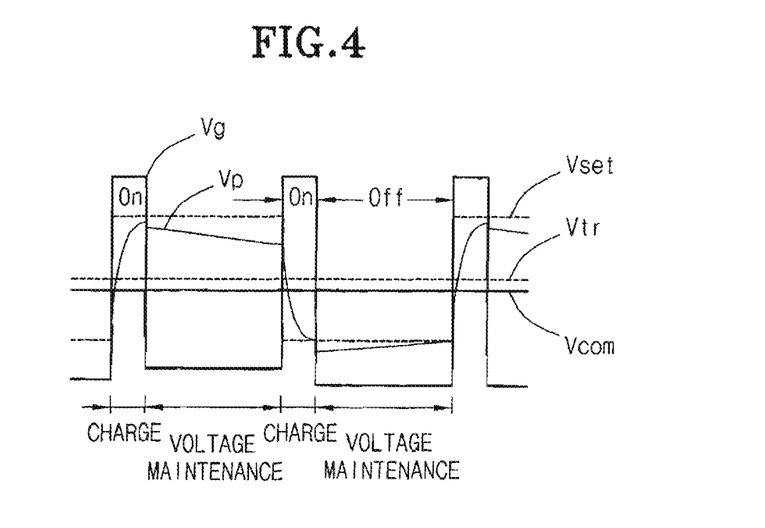
FIG. 4 is a waveform diagram illustrating the operation of the OCB mode liquid crystal display according to an embodiment of the present invention.

FIG. 4 is a waveform diagram illustrating the operation of the OCB mode liquid crystal display which has been established to apply a pre-tilt voltage $V_{set}$ of a predetermined level to the upper and lower pre-tilt electrodes through the above-mentioned procedure.

As shown in FIG. 4, a pre-tilt voltage $V_{set}$ equal to or higher than the transition voltage $V_{tr}$ is applied between the upper and lower pre-tilt electrodes of the OCB mode liquid crystal display. Such a pre-tilt voltage $V_{set}$ shifts a portion of the liquid crystal molecules from an initial orientation state into the first orientation state, that is, to the bend orientation state or to the vertical orientation state. In addition, in the OCB mode liquid crystal display, the gate voltage Vg of a predetermined level is periodically applied, and the pre-tilt voltage $V_{set}$ is applied with its polarity repeatedly inverted at the same period as that of the gate voltage Vg.

In this case, the gate voltage Vg is applied to a gate electrode connected a gate line to be displayed, thereby turning on a corresponding thin-film transistor, and a data voltage expressing an image signal is applied to the source electrode thereof so that the applied data voltage may be outputted through the drain electrode thereof. Then, the data voltage outputted through the drain electrode is applied to one driving electrode (pixel electrode) as a driving voltage (or a pixel voltage; Vp). The pixel voltage Vp applied the pixel electrode and a common voltage Vcom applied to another driving electrode (common electrode) corresponding to the pixel voltage forms an electric field by a potential difference between the voltages. The potential difference is applied to liquid crystal molecules interposed between a pair of driving electrodes to align the liquid crystal molecules in the second orientation state, thereby transmitting light to obtain an image. The pixel voltage Vp is charged during a period in which the gate voltage Vg is applied, and is maintained at a predetermined level during a period in which the gate voltage Vg is not applied.

Thereafter, when the gate voltage Vg is again applied, the thin-film transistor is turned on, the pixel voltage Vp is applied to the pixel electrode and is charged. In this case, the pre-tilt voltage $V_{set}$ and the pixel voltage Vp have polarities reversed from those of the previous frame, and the pre-tilt voltage $V_{set}$ has a higher voltage level than the pixel voltage Vp. Meanwhile, when the gate voltage Vg is not applied, the thin-film transistor is turned off, and the pixel voltage Vp is maintained at a predetermined level. By the electric field between the pixel voltage Vp applied the pixel electrode and the common voltage Vcom applied to the common electrode, a potential difference is formed. Such a potential difference is applied to liquid crystal molecules interposed between a pair of driving electrodes to align the liquid crystal molecules in the second orientation state, thereby transmitting light to obtain an image.

Consequently, while the gate voltage Vg and the pre-tilt voltage $V_{set}$ are periodically applied to the OCB mode liquid crystal display, the pixel voltage Vp is applied, thereby obtaining continuous images.

As described above, the OCB mode liquid crystal display according to an embodiment of the present invention includes at least one pair of pre-tilt electrodes, which are arranged to partially cover each of the upper and lower driving electrodes of the upper and lower substrates. A pre-tilt voltage equal to or higher than the transition voltage is applied between the pre-tilt electrodes to shift a portion of liquid crystal molecules into the first orientation state. Thereafter, when a driving voltage is applied between the upper and lower driving electrodes, the liquid crystal molecules rapidly are shifted from the first orientation state into the second orientation state. In this case, although a low driving voltage is applied between the upper and lower driving electrodes, the liquid crystal molecules can be shifted into the second orientation state. As a result, the OCB mode liquid crystal display according to an embodiment of the present invention has a high response speed and can be driven with low power.

Although the embodiments of the present invention has been illustrated and described with respect to only a pair of driving electrodes included between the upper and lower substrates, those skilled in the art will appreciate that a pair of driving electrodes corresponds to one pixel, and thus many pairs of driving electrodes (i.e., array of pairs of driving electrodes) are formed in the upper and lower substrates.

As described above, according to an embodiment of the present invention, the OCB mode liquid crystal display includes at least one pair of upper and lower pre-tilt electrodes to partially cover each of the upper and lower driving electrodes. A pre-tilt voltage equal to or higher than the transition voltage is applied between the upper and lower pre-tilt electrodes to shift the orientation state of the liquid crystal molecules into the first orientation state, that is, to shift the orientation state of the liquid crystal molecules into the bend or vertical orientation state. As a result, although a low driving voltage is applied between the upper and lower driving electrodes, the liquid crystal molecules can rapidly be shifted into the second orientation state for screen display. Consequently, the OCB mode liquid crystal display according to an embodiment of the present invention can achieve a high response speed, so that it is possible to display a high-speed moving picture and to reduce power consumption because it can operate with low power.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An optically compensated bend (OCB) mode liquid crystal display comprising:
   upper and lower driving electrodes to which a driving voltage is applied, the upper and lower driving electrodes being provided at upper and lower substrates opposed to each other, respectively;
   a liquid crystal layer including a plurality of liquid crystal molecules interposed between the upper and lower substrates; and
   at least one pair of upper and lower pre-tilt electrodes to which a voltage to shift an orientation state of a portion of the liquid crystal molecules is applied, the upper and lower pre-tilt electrodes being located substantially opposite to each other to partially cover each of the upper and lower driving electrodes and to controllably effectuate the orientation of liquid crystal molecules in the liquid crystal layer responsive to a voltage applied to the pre-tilt electrodes;
   wherein the OCB mode liquid crystal display is configured such that, pre-tilt voltages are applied to the pre-tilt electrodes during operation of the OCB mode liquid crystal display, at substantially the same time that a gate voltage is repeatedly applied to a gate of a transistor, and a data voltage expressing an image signal is applied to a source of the transistor, responsive to the gate voltage, thereby controlling a pixel.

2. The OCB mode liquid crystal display as claimed in claim 1, wherein the pair of upper and lower pre-tilt electrodes are located in parallel to surfaces of the substrates, and are opposed to each other with the liquid crystal layer interposed between them in a direction perpendicular to the surfaces of the substrates.

3. The OCB mode liquid crystal display as claimed in claim 1, wherein the pair of upper and lower pre-tilt electrodes are located to partially cover the upper and lower driving electrodes, respectively, with an insulation layer interposed between the upper pre-tilt electrode and the upper driving electrode and with an insulation layer between the lower pre-tilt electrode and the lower driving electrode.

4. An optically compensated bend (OCB) mode liquid crystal display comprising:
   an array of upper and lower driving electrodes, provided in upper and lower substrates, corresponding ones of said upper and lower electrodes forming pairs of upper and lower electrodes, the upper and lower substrates being opposed to each other;
   a liquid crystal layer including a plurality of liquid crystal molecules interposed between the upper and lower substrates; and
   at least one pair of upper and lower pie-tilt electrodes corresponding to a pair of the upper and lower driving electrodes, the upper and lower pre-tilt electrodes being arranged to partially cover each of the upper and lower driving electrodes with an insulation layer interposed between the upper pre-tilt electrode and the upper driving electrode and with an insulation layer between the lower pre-tilt electrode and the lower driving electrode upper and lower pre-tilt electrodes receiving a pre-tilt voltage to controllably shift an orientation state of a portion of the liquid crystal molecules by an amount corresponding to the pre-tilt voltage received by said pre-tilt electrodes;

wherein the OCB mode liquid crystal display is configured such that, pre-tilt voltages are applied to pre-tilt electrodes during operation of the OCB mode liquid crystal display, the pre-tilt voltages being applied at substantially the same times that gate voltages are repeatedly applied to gates of transistors, and data voltages expressing an image signal are applied to a source of the transistors, responsive to the gate voltage to control a pixel.

5. The OCB made liquid crystal display as claimed in claim 4, wherein the pair of upper and lower pre-tilt electrodes are located in parallel to surfaces of the substrates, and are opposed to each other with the liquid crystal layer interposed between them in a perpendicular direction to the surfaces of the substrates.

6. An optically compensated bend (OCB) mode liquid crystal display comprising:
   a pair of substrates opposed to each other with a liquid crystal layer interposed between them;
   a common electrode formed on one of the substrates;
   a pixel electrode array to which a driving voltage is applied, the pixel electrode array being formed on another of the substrates; and
   at least one pre-tilt electrode being arranged to partially cover each pixel electrode of the pixel electrode array, and receiving a pre-tilt voltage to controllably shift an orientation state of a portion of liquid crystal molecules included in the liquid crystal layer by an amount corresponding to the pre-tilt voltage, the orientation state of the portion of liquid crystal molecules capable of being varied continuously by changing the pre-tilt voltage;
   wherein the OCB mode liquid crystal display is configured such that pre-tilt voltage is applied to the at least one pre-tilt electrode during operation of the OCB mode liquid crystal display, at substantially the same times that a gate voltage is repeatedly applied to a gate of a transistor and a data voltage expressing an image signal is applied to a source of the transistor, responsive to the gate voltage, thereby controlling a pixel.

7. The OCB mode liquid crystal display as claimed in claim 6, wherein each of the pre-tilt electrodes is located in parallel to the pixel electrode extending in parallel to surfaces of the substrates, with the liquid crystal layer interposed between the pre-tilt voltage and the common electrode.

8. A method for driving an optically compensated bend (OCB) mode liquid crystal display, the method comprising the steps of:
   controllably arranging liquid crystal molecules into a first orientation state by periodically applying a pre-tilt voltage to upper and lower pre-tilt electrodes attached to upper and lower insulation layers, that are deposited on upper and lower driving electrodes respectively, at substantially the same times that a gate voltage is repeatedly applied to a gate of a transistor and a data voltage expressing an image signal is applied to a source of the transistor, the liquid crystal molecules being oriented in partially different orientations in the first orientation state responsive to the pre-tilt voltage; and
   repeatedly applying said gate voltage to said gate of said transistor to provide a data voltage, which shifts the liquid crystal molecules from the first orientation state into a second orientation state or image display by applying the driving voltage to the upper and lower driving electrodes, substantially all the liquid crystal molecules being oriented in an equal direction for image display in the second orientation state.

9. The method as claimed in claim 8, wherein the applied pre-tilt voltage has a higher level than that of a transition voltage of a mode in which the pre-tilt voltage is not applied.

10. The method as claimed in claim 8, wherein the applied pre-tilt voltage has a higher level than that of the driving voltage for image display.

11. The method as claimed in claim 8, wherein the pre-tilt voltage is applied with a polarity which is repeatedly inverted at a period equal to that of the gate voltage.

12. The OCB mode liquid crystal display of claim 1, wherein the pre-tilt electrodes are configured to partially align at least some of the liquid crystal molecules, into a light permeable orientation without the partial alignment being visible through the liquid crystal layer.

13. The OCB mode liquid crystal display of claim 1, wherein the upper and lower driving electrodes are configured to orient liquid crystal molecules to transmit light through the liquid crystal layer, responsive to a first driving voltage applied to said upper and lower driving electrodes, and wherein the upper and lower pre-tilt electrodes are configured to reduce the first driving voltage required to orient the liquid crystal molecules to transmit light, responsive to the magnitude of the first pre-tilt voltage applied to said pre-tilt electrodes.

* * * * *